May 22, 1962

W. W. McLEAN 3,035,719

POWER SHUTOFF DEVICE FOR SILO UNLOADERS

Filed Dec. 21, 1959

INVENTOR
WILLIAM W. McLEAN

ATTORNEY

May 22, 1962 W. W. McLEAN 3,035,719
POWER SHUTOFF DEVICE FOR SILO UNLOADERS
Filed Dec. 21, 1959 4 Sheets-Sheet 2
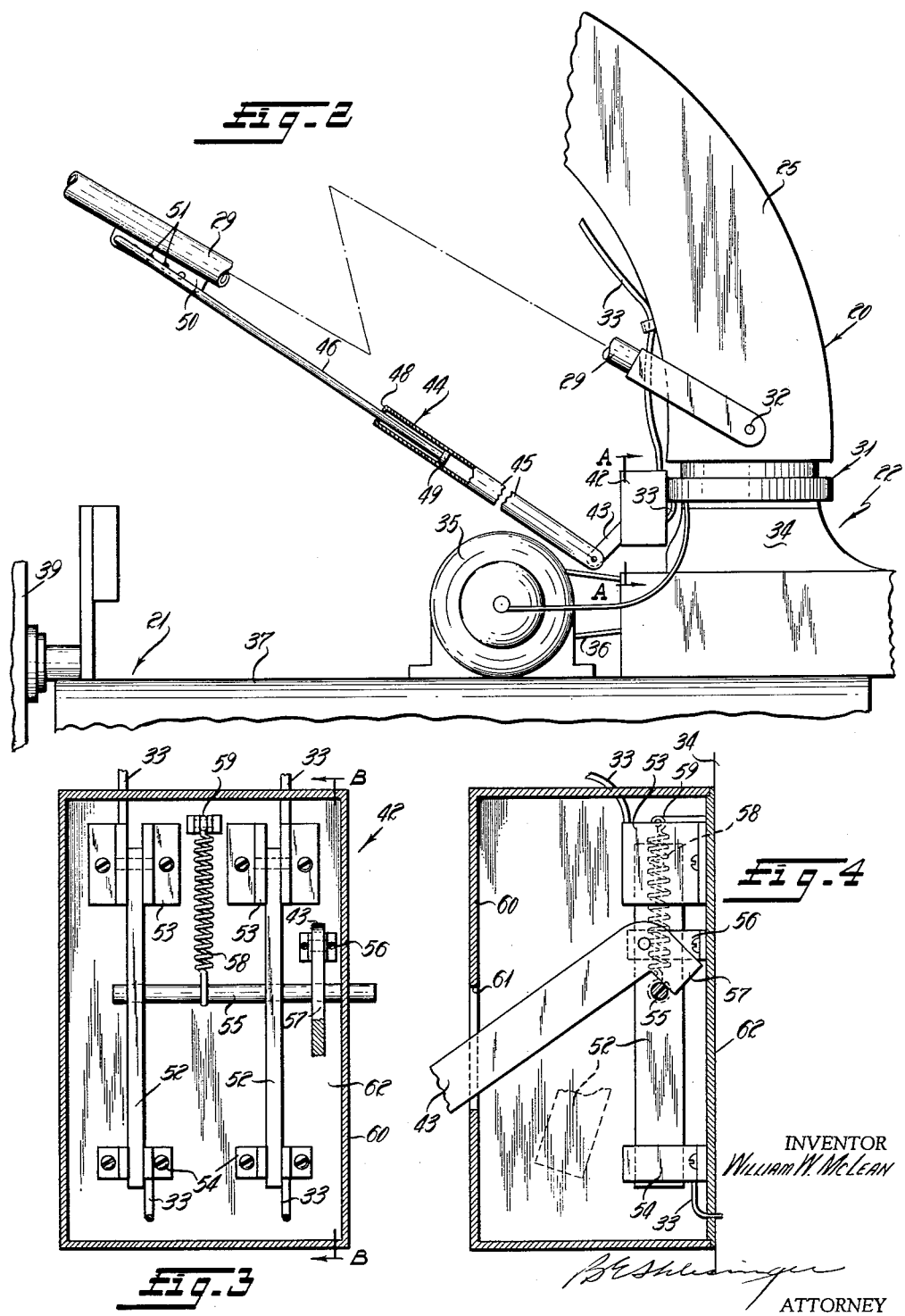
INVENTOR
WILLIAM W. McLEAN
ATTORNEY

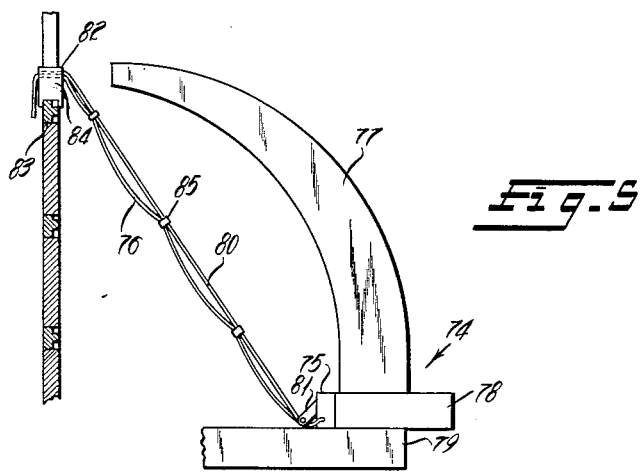
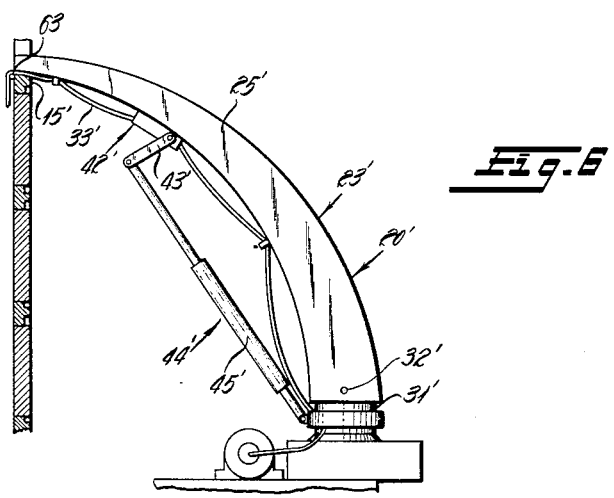
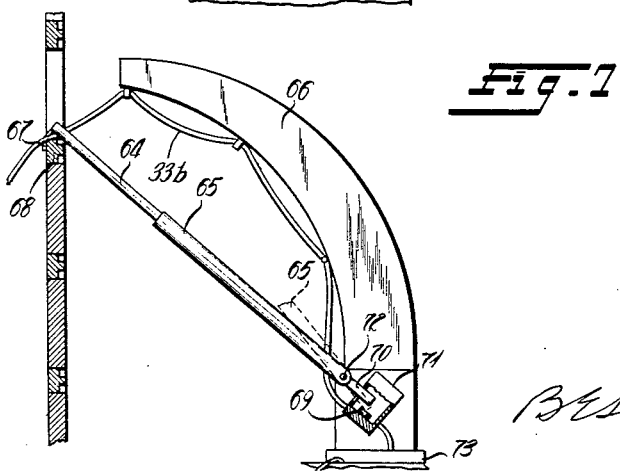

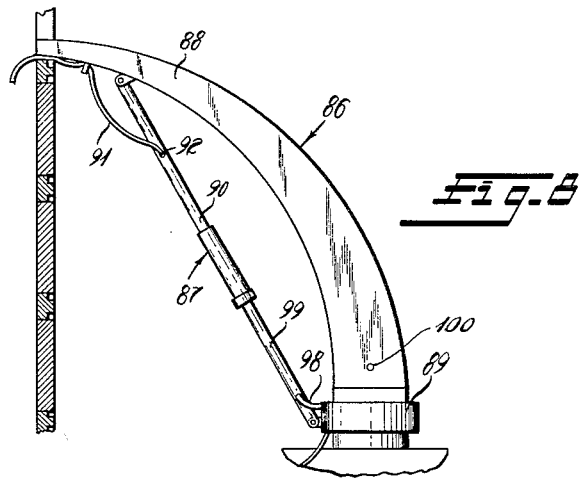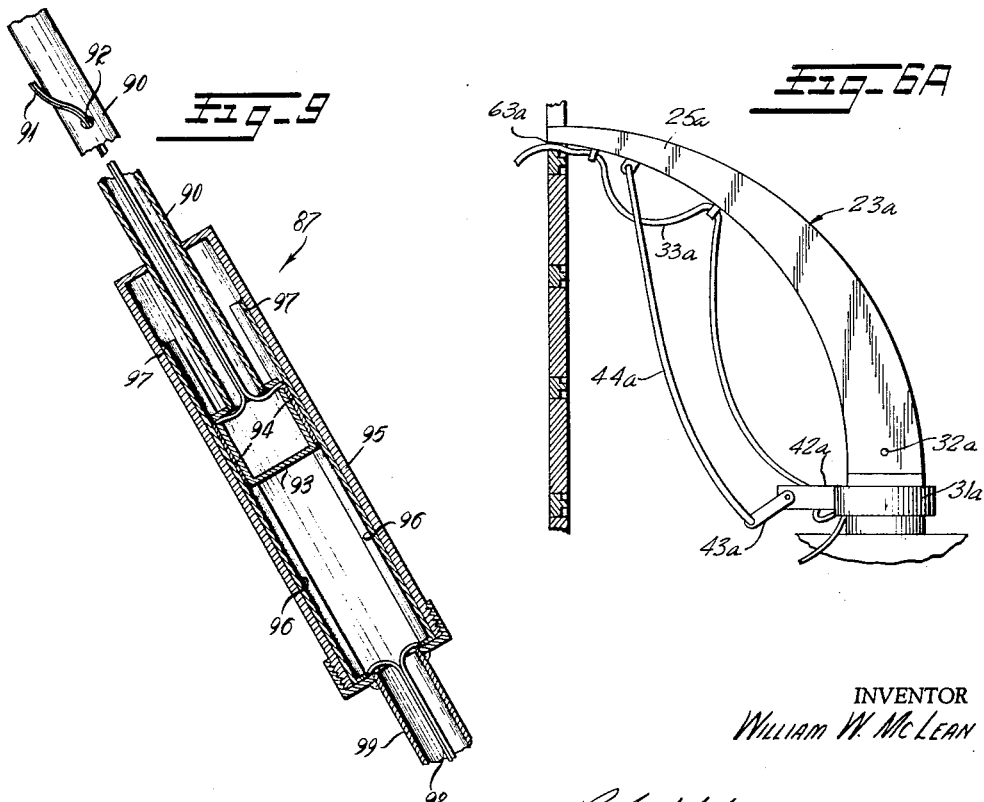

United States Patent Office 3,035,719
Patented May 22, 1962

3,035,719
POWER SHUTOFF DEVICE FOR SILO UNLOADERS
William W. McLean, Lewis, Kans.
Filed Dec. 21, 1959, Ser. No. 860,926
13 Claims. (Cl. 214—17)

This invention relates to a new and useful improvement in silo unloaders. More particularly the invention relates to a new and useful improvement in silo unloaders which are designed for automatically following the level of the ensilage as it descends in the silo for the efficient unloading thereof.

The object of this invention is to provide a power shutoff device including a switch and switch operating means for the purpose of rendering the silo unloader inoperable after it has descended a desired distance in the silo. Silos in the usual form comprise an upright circular cylindrical wall which is provided with a conical or hemispherical dome roof and a closed bottom. Into this shell the ensilage formed of chopped green fodder is tightly packed. The silo is ordinarily provided with a plurality of lateral outlets or doorways extending vertically up one side of the silo and a chute positioned externally thereto. In the past, in removing the ensilage from the silo for stock feeding purposes, it has been the usual practice to climb up to the ensilage level and manually shovel the ensilage into the chute. The plurality of apertures are normally closed by a plurality of doors or panels which are removed one by one from the top down as the surface level of the ensilage is reduced, so that the operator will have a convenient aperture through which to remove the silage.

Various automatic unloaders have been developed for removing the ensilage from silos that are designed to feed ensilage laterally through an opening in the silo wall and to follow down upon the surface of the ensilage in the silo as the ensilage is fed therefrom.

Almost all automatic unloaders of this type have a discharge unit comprising a chute, endless chain elevator or the like with or without a supporting arm, an independent torque or guide arm, or both, pivotally attached to the unloader proper and arranged to allow the outer end thereof to rest on an appropriate lug or other securing device located on the silo wall.

The mode of operation of this type of unloader is to open the appropriate discharge openings in the silo wall above the level of the ensilage and position the outer end of the discharge unit or guide arm against the wall of the silo so that the ensilage stream ejected from the unloader will pass through the uncovered discharge openings. The silo unloader is then operated from a remote point on the ground by closing the electrical power supply circuit for the unloader when more ensilage is desired. After a certain amount of operation, the surface level of the ensilage is lowered and consequently the unloader has descended to a point at which the ensilage discharge will be directed upwardly at a high angle, causing inefficient discharge and clogging in the discharged unit. At this point it is necessary for the operator to shut off the unloader, uncover the newly exposed discharge opening and reset the outer end of the discharged unit to rest against the silo wall at a point such that the ensilage discharge will be directed through the discharge openings at the lowest angle possible.

Much difficulty has been experienced in the above operation in determining when the silo unloader has descended to such a point that it is necessary and desirable to open lower discharge openings and to readjust the discharge unit. In the past it has been necessary to climb the silo to the point of operation periodically to determine the operating level. Frequently, when the operator neglects to check the level of operation, the unloader is allowed to descend so far that only a small portion of the ensilage stream is able to clear the discharge opening. A further consequence is that the ensilage will not have the momentum at this angle of discharge to clear the discharge chute and will consequently fall back therein causing clogging and ensuent breakdown of the unloader or, in the case of an endless conveyer discharge unit, the ensilage will fall from the elevator flights causing clogging. Even if these difficulties are overcome, the unloader will finally descend to the point where the ensilage stream from the discharge unit will not pass to the exposed discharge openings or where the full weight of the unloader is on the torque arm, discharge arm or discharge chute attached to the silo wall, consequently causing damage to the unloader or the silo wall.

It is another object of this invention to provide a power shutoff device for silo unloaders which is designed to make the unloader inoperable when the silo unloader has descended from an initial operating position to a point where it is necessary and desirable to reset the discharge unit and to expose lower discharge openings on the silo.

It is a further object of this invention to provide a power shutoff device for silo unloaders that is simple, inexpensive and positively-acting and which can readily be adapted, installed and used on all present types of silo unloaders.

It is a further object of this invention to provide a power shutoff device for silo unloaders not having a pivotally attached member extending to the silo wall. The use of this shutoff device is similar to that of the shutoff device described for unloaders having a pivotally attached discharge unit or torque arm. The shutoff device is provided so that the unloader is rendered inoperative when it has descended out of communicative relationship with the opened discharge openings.

A further object of this invention is to provide a power shutoff device that will support and guide the power supply cable to the unloader.

It is a further object of this invention to provide a power shutoff device that is easily adjustable to desired distances of descent or angular movement of the unloader discharge unit.

It is a further object of this invention to provide a power shutoff device for silo unloaders that operates independently of the height of the unloader in the silo but responds to the operating level of the unloader in relation to the opened discharge openings in the silo.

It is a further object of this invention to provide a power shutoff device for silo unloaders that responds to the angular position of a discharge unit or torque arm pivotally mounted thereon.

Further objects of this invention are those apparent and inherent in the apparatus as described, pictured and claimed.

This invention will be described with reference to the drawings, forming a part of the application, in which corresponding numerals refer to the same parts and in which:

FIGURE 2 is an enlarged fragmentary elevational view partially in section of the unloader as shown in FIGURE 1;

FIGURE 3 is a cross sectional view of the switch shown in FIGURE 2 taken along line A—A of FIGURE 2;

FIGURE 4 is a cross sectional view of the switch shown in FIGURES 2 and 3 taken along the line B—B in FIGURE 3;

FIGURE 5 is a fragmentary front elevation of another type of silo unloader in operating position in a silo embodying another form of the invention;

FIGURES 6 and 6A are fragmentary front elevation views of another type of silo unloader in operating position in a silo each embodying another form of the invention;

FIGURE 7 is a fragmentary front elevation of another type of silo unloader in operating position in a silo embodying another form of the invention;

FIGURE 8 is a fragmentary front elevation of another type of silo unloader in operating position in a silo embodying another form of the invention;

FIGURE 9 is an enlarged fragmentary elevational view partially in section of the unloader shown in FIGURE 8.

Unloader Description

Figure 1:
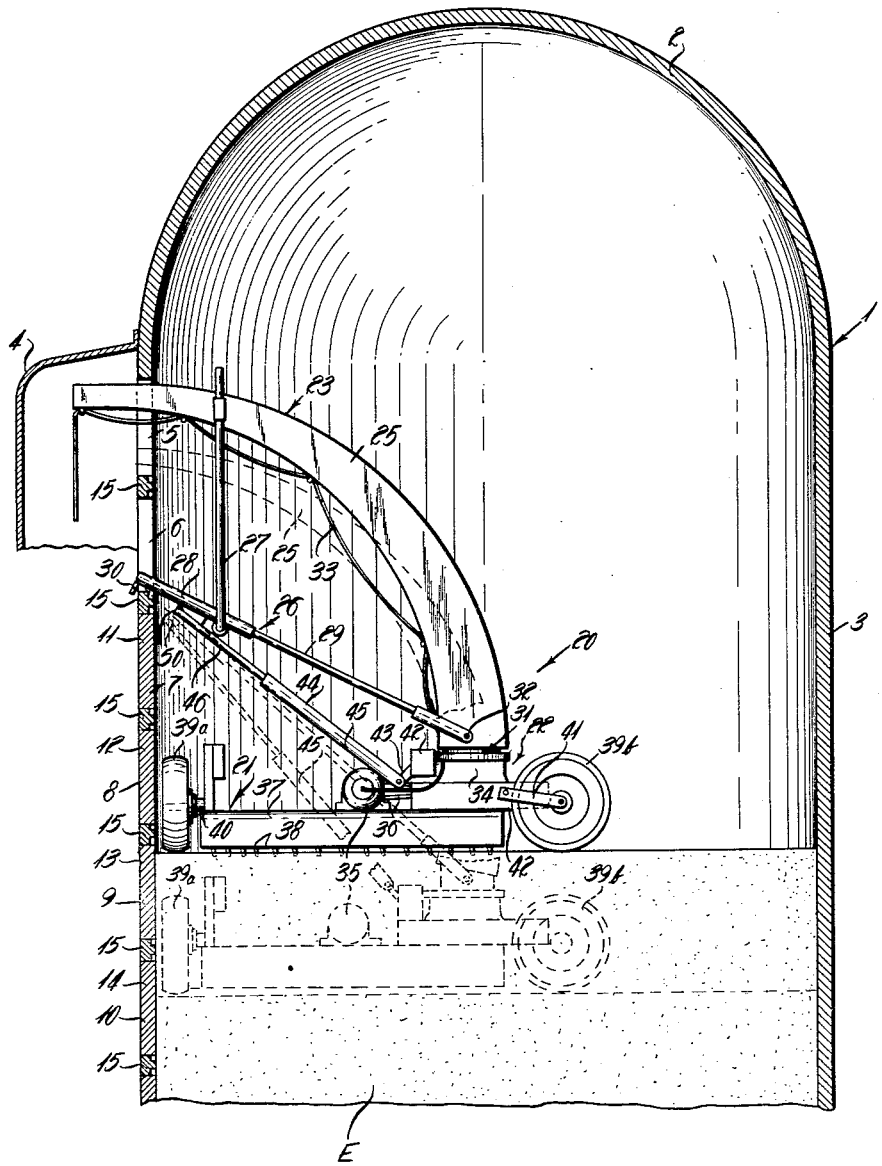
FIGURE 1 is a front elevation view of a silo unloader embodying the invention, shown in position in a silo, in the upper operating position in dark lines and in the lower shutoff position in dotted lines, and with the walls of the silo shown in vertical section.

Referring now to the drawings and particularly to FIGURE 1, there is shown a silo generally designated 1 capped by a hollow semi-spherical dome 2 having a vertical cylindrical wall 3 and an exterior chute 4. Dome 2 and chute 4 are seated and secured respectively to cylindrical wall 3 in any of the conventional well known manners which will not be described in great detail inasmuch as they form no part of this invention, per se. Disposed in the wall 3 of the silo 1 underneath the cover of the exterior chute 4 is a plurality of vertically positioned apertures 5–10. The apertures 5–10 are provided with facings of any suitable sort which are adapted to receive and retain doors therein as is illustrated best with reference to FIGURE 1 wherein are shown doors 11–14 for apertures 7–10. Thus, as may be seen with reference to that figure, when the ensilage E is stored in the silo, the doors, which can be hinged or removed as at 14, are placed in their corresponding apertures, as at 10, and retained therein by any suitable means, the ensilage alone being packed sufficiently tightly to retain them in place. Cross members 15 serve to provide a facing for the doors as 11–14.

The unloader, generally designated 20, comprises a gathering or collecting means 21 comprising a rotary auger means as later explained, an elevating means 22 positioned at the end of the unloader designed to reside at the center of the silo and a discharge unit 23.

Discharge unit 23 comprises discharge chute 25 and support arm 26 adjustably secured together by strut 27 therebetween. Support arm 26 comprises sleeve 28 within which rod 29 is slidably mounted for axial movement. Sleeve 28 is provided with lip 30 which depends so as to hook over cross brace 15 and be pivotally secured thereto as shown in FIGURE 1.

Discharge chute 25 and support arm 26 are coaxially and pivotally mounted at 32 on support ring or means 31 which is connected to and encircles the discharge opening of blower 34 of elevating means 22. Support ring 31 is rotatably mounted on the discharge opening of elevating means 22 and contains sliding electrical contacts for transmitting electrical power from electrical power supply cable 33 to motor 35 of elevating means 22 and at the same time permitting free rotation of support ring 31.

Elevating means 22 comprises blower 34 driven by electrical motor 35 through pulley 36. Blower 34 has a discharge opening at its top communicating with discharge chute 25 through support ring 31.

Collecting means 21 is a radial gathering arm or auger assembly comprising a frame 37 surrounding the upper portions of and rotatably mounting auger screw 38. Auger screw 38 is driven by motor 35, being coupled thereto at its inner end by appropriate gearing. The inner end of frame 37 is secured to the lower end of blower 34 and provided with a communicating opening therebetween. Auger assembly 21 is provided with drive wheel 39a revolvably mounted on axle 40 connected to the outer end of frame 37.

Unloader 20 is also provided with support wheel 39b at its inner end revolvably mounted on axle 41 which is in turn supported by frame 42 of blower 34.

Unloader Operation

In general, the operation of the unloader is as follows. The unloader having been positioned in the silo as indicated in FIGURE 1, with support wheel 39b at the center of the silo, drive wheel 39a adjacent to the wall of the silo and lip 30 of support arm 26 over the appropriate cross member 15 so that discharge chute 25 communicates with an opened discharge opening such as at 5, is ready for use.

To use the unloader, electric current is fed through power line 33, through switch 42, which will be described in more detail further on, through the sliding contacts in support ring 31, through power line 41 to motor 35, whereupon the motor will be run to operate the unloader. The parts of the unloader operated by the motor is, first, blower 34, then auger 38 and then drive wheel 39a which will push the outer end of gathering arm 21 circumferentially around the silo adjacent to the silo wall while support wheel 39b remains at a point at the center of the silo. It can be seen that while the unloader proper thus rotates across the surface of the ensilage E about its inner end, discharge unit 23 will remain at its position at the silo wall, relative rotation between the unloader and the discharge unit being accommodated by rotatably mounted support ring 31.

In its movement across the surface of the ensilage E, auger screw 38 will engage a shallow depth of the surface of the ensilage and, as the unloader moves in its circular path, auger screw 38 will move the material engaged thereby toward and into the communicating blower 34 whereupon the blower will carry and blow the ensilage fed thereinto through the discharge opening located at its top, thus through support ring 31 encircling the discharge opening of blower 34 into discharge chute 25 with sufficient force to propel the ensilage therethrough and out discharge opening 5 in silo wall 3.

Description of Power Shutoff Device

Referring now to FIGURE 2, connected in electrical power line 33 and rigidly supported on support ring 31 is bayonet throw switch generally designated 42 having throw lever 43. Pivotally connected to throw lever 43 is sleeve 45 of telescoping boom 44 in which rod 46 is slidably mounted for axial movement therethrough. At the front end of rod 46 is detent 49 which abuts against cap 48 secured to the rear end of sleeve 45 when rod 46 is retracted to its rearmost position. The rear end of rod 46 is pivotally mounted in one of holes 51 in bracket 50 on support arm rod 29. The plurality of mounting holes 51 in bracket 50 provides for adjustment of the position of the rear end of rod 46 along support arm rod 29 for overall positioning of boom 44 with respect to unloader discharge unit 23.

Referring to FIGURES 3 and 4, bayonet throw switch 42, the switch preferred by me, has knife blades 52 connecting the two leads of power supply cable 33 through input terminals 53 and output terminals 54. Knives 52 are pivotally connected to and supported by terminals 53 and slidably engageable through friction contact with output terminals 54. Rigidly interconnecting knife blades 52 and extending to one side thereof is operating rod 55. Rod 55 is insulated or composed of a non-conducting material so as not to provide an electrical path between knife blades 52 and to allow for manual operation of the switch. Throwing lever 43 is pivotally mounted on support 56 and is provided with camming arm 57 at one end thereof which pushes operating rod 55 upward when throwing lever 43 is rotated, thus pulling knife blades 52 up and out of contact with terminals 54, throwing the switch. Spring 58 is connected to operating rod 55 and extends to and is secured to support 59 located at a point beyond terminals 53 from operating rod 55.

Switch 42, thus spring loaded, is instantaneously opened upon the urging of arm 57 of throw lever 43, assisted by the pull of spring 58 after knives 52 have rotated over dead center. This type of switch is preferred to prevent arcing as the switch is opened and to provide instantaneous opening of the contact knives. The switch may be reset to the contacting or on position by manual rotation of knife blades 52 by operation of the outer end of operating rod 55 which extends to the outside of switch enclosing case 60 of switch 42 through an opening provided therethrough. An opening 61 is also provided in case 60 for the operating path of throw lever 43. Terminals 53 and 54 and supports 56 and 59 are insulatedly connected to and supported by enclosing case floor 62.

*Operation of Power Shutoff Device*

The overall operation of the power shutoff device described above is as follows. When the silo unloader 20 is in operating position in the silo 3 as shown in FIGURES 1 and 2, switch 42 is in the connecting position and detent 49 on rod 46 of telescoping boom 44 lies at a point in sleeve 45 spaced from sleeve cap 48 so as to give a desired travel distance of the rod relative to the sleeve before detent 49 reaches and is stopped by cap 48. As the unloader operates and descends in the silo, discharge unit 23 including support arm 26 pivots about its pivot point 32 while the unloader proper retains a horizontal attitude during the descent. The upward angular movement of support arm 26 relative to the unloader increases the distance between bracket 50 on support arm rod 29 and throw lever 43 mounted on support ring 31, thereby causing telescoping boom rod 46 connected to bracket 50 to travel axially outward in sleeve 45 connected to throwing lever 43 until detent 49 rides against cap 48 thereby stopping the relative movement of rod 46 to sleeve 45 and causing movement of sleeve 45 upon the continued angular movement of support arm 26 whereupon sleeve 45 will pull throw lever 43 thereby disconnecting switch 42 as described above. Thus the operation of the unloader is stopped at the level illustrated by the dotted lines in FIGURE 1 where throw lever 43 has been pulled, disconnecting switch 42.

It can be seen that after proper adjustment has been made, the operator need only turn on the unloader by a switch located at a point at the bottom of the silo and when the unloader has descended to proper shut-off point for the discharge openings employed, the unloader will shut itself off automatically, notifying the operator that it is time for readjustment and the operator then may ascend to open new discharge openings and reset the discharge unit and switch. No intermediate inspection of the unloader operate position is required due to the automatic shut-off device

*Modification of FIG. 5*

FIGURE 5 shows another form of the invention particularly useful on unloaders such as 74 which have neither a torque arm nor a discharge unit engageable with the silo wall. Unloader 74 comprises a discharge chute 77, a blower unit 78, a frame 79 and a rotating gathering arm therebelow (not shown). A switch 75 interposed in the power supply cable 76 is secured to blower unit 78. Throw lever 81 of switch 75 is connected to a flexible operating cable 80 which extends to clamp 84 removably secured to cross beam 83 of the silo wall. Operating cable 80 is fastened to clamp 82 in any convenient manner. Power supply cable 76 is supported and guided to the unloader along operating cable 80 by suitable clamps 85.

The length of operating cable 80 is such that in the upper operating position of the unloader, it is sufficiently slack to allow descent of the unloader a desired distance before cable 80 becomes taut, thereby operating lever 81 of switch 75, shutting off the unloader.

Operating cable 80 is shown supporting electrical power supply line 76 but operating cable 80 may be eliminated by securing power supply cable 76 to clamp 84, allowing the proper amount of slack in line 76 between clamp 84 and throw lever 81 and securing cable 76 to throw lever 81, and leaving sufficient slack in cable 76 between lever 81 and switch 75 to allow pivotal operation of lever 81.

One possible modification of this embodiment of the invention is to change the position of switch 75 by mounting it on clamp 84 and then the other end of operating cable 80 can be secured at any convenient point on unloader 74.

A further modification is to mount switch 75 directly on silo wall cross bar 83 and to extend the operating cable 80 to the unloader and secure it thereto.

*Modifications of FIGURES 6 and 6A*

FIGURE 6 shows another embodiment of the invention as adapted for use on a silo unloader which has a discharge unit such as 23' composed only of discharge chute 25'. Discharge chute 25' is normally supported on a cross beam 15' of the silo wall and is held thereto by detent 63 depending from its outer end. In this modification, switch 42', interposed in electrical supply cable 33', is supported by and mounted on discharge chute 25' near its outer end. Telescoping boom 44' is connected to throw arm 43' of switch 42'; and extends to support ring 31' and is pivotally mounted thereon at 32'. The operation of unloader 20' and the power shutoff device and the structure of unloader 25' is the same as in unloader 20 hereinbefore described. It may be preferred to mount a flange 50 with a plurality of holes 51, as shown in FIGURE 1, on support ring 31' for pivotally mounting the appropriate end of sleeve 45' of telescoping boom 44'. It is apparent to those skilled in the art that if a support arm 26, as shown in FIGURE 1, were provided on discharge unit 23', switch 42' may be mounted thereupon or upon discharge chute 25' with equal facility.

A further modification may be employed which consists of replacing either rigid telescoping boom 44 or 44' (the switch actuating means) with a flexible cable of such length that, when the unloader moves downwardly in the silo a preselected distance causing the discharge unit to pivot through an angle with respect to the unloader, it will actuate the switch to stop the unloader. Reference is made to FIG. 6A for this embodiment wherein the flexible cable referred to is designated 44a. In FIG. 6A the switch is carried on the swivel 31a and switch lever 43a is connected to one end of cable 44a. The other end of cable 44a is fixed to discharge unit 25a. Discharge unit 25a is pivotally mounted at the silo opening 63a and pivotally mounted at 32a on support ring 31a. Power line 33a extends from outside of the silo through switch 43a and thence through contacts in support ring 31a to the unloader motor.

The position at which switch 42 of FIGURE 1 or sleeve 45' of telescoping boom 44' in FIGURE 6 are mounted on the unloader is not critical. The only limitation is that telescoping boom 44' cannot be mounted so as to pivot co-axially with discharge unit 23'. The best position for mounting the switch or the telescoping boom either as in FIGURE 1 or FIGURE 6 depends upon the structure of the unloader in question. In the unloader portrayed in FIGURES 1 and 6 in which the entire unloader proper rotates in the silo, it is necessary to position switch 42 in FIGURE 1 on support ring 31 and the pivoted end of sleeve 45' in FIGURE 6 on support ring 31' since the support rings do not rotate with respect to the discharge units. In other types of unloaders, only the gathering arm rotates while the rest of the unloader does not rotate. In these types of unloaders, it can be seen that switch 42 of FIGURE 1 and sleeve 45' of FIGURE 6 may be mounted on any portion of the unloader that does not rotate with respect to the discharge unit.

*Modification of FIGURE 7*

FIGURE 7 shows an adaptation of the invention for an unloader employing a torque or guide arm 65 to prevent rotation of the discharge unit 66 of the unloader. Torque arm 65 is provided with a telescoping extension 64 having a depending detent 67 at its outermost end for engagement with a cross beam 68 of the silo wall. Torque arm 65 is pivotally mounted at 72 on discharge unit 66 and provided with operating extension 70 extending beyond pivot point 72 in operative position with throw lever 69 of switch 71 also mounted on discharge unit 66. Electrical power line 33b may be supported from discharge unit 66 as in FIG. 6 to extend out of the silo to the power source. Power line 33b in which switch 71 is interposed extends through sliding contacts in support ring 31 to the unloader motor (not shown) as in the previous embodiments. When switch 71 is in the on position, throw lever 69 extends upward in the path swept by operating extension 70 as torque arm 65 rotates about pivot point 72. As the silo unloader descends in the silo, torque arm 65 pivots around pivot point 72, thus causing operating extension 70 to pivot downwardly to operate throwing lever 69 of switch 71 thereby stopping the unloader operation.

This form of the invention is particularly useful in types of unloaders as pictured in FIGURE 7 in which the discharge unit is not pivotally mounted on the unloader proper nor engaged with the wall of the silo. Discharge unit 66 is held from rotation by stationary torque arm 65 while the unloader proper rotates with respect to discharge unit 66 by the accommodation of the rotatable mounting 73 by which the unloader supports discharge unit 66.

Modification of FIGS. 8 and 9

FIGURE 8 illustrates a simple shutoff device in which the switch is incorporated in a telescoping boom. Unloader 86 is structurally the same as unloader 20' shown in FIGURE 6 wherein 86 indicates the discharge unit comprising discharge chute 88 which is pivotally mounted at 100 on the usual support ring 89. Telescoping boom 87 is provided between discharge chute 88 and support ring 89 and pivotally mounted on each. Referring now to FIGURE 9, telescoping boom 87 includes hollow rod 90 pivotally mounted to discharge chute 88 and receiving electrical power supply cable through a convenient hole 92. Cable 91 extends through the length of hollow rod 90 to drum 93 at the end thereof. Drum 93 has a pair of electrical contacts 94 on the outside thereof in sliding contact with the walls of sleeve 95. Rod 90 and drum 93 secured to the end thereof are slidably received and mounted in sleeve 95 for axial movement therethrough. Sleeve 95 supports a pair of exposed electrical strip contacts 96 which extend on opposite sides of sleeve 95 from a point 97 a short distance from the rod-receiving end of sleeve 95 to the other end of sleeve 95. Sliding contacts 94 are positioned on drum 93 so as to slidably contact the respective strip contact 96. Power supply cable 91 has two electrical leads, one of which is connected to one contact 94 and the other connected to the other contact 94. Contacts 96 are each connected to one of the two leads of power cable 98 which extends through rod 99 and exits therefrom through a convenient hole in rod 99 and is connected to the sliding electrical contacts in support ring 89. Another electrical cable connects the sliding contacts to the unloader motor by which the unloader is operated.

The sleeve is threadably secured to hollow rod 99 which extends to and is pivotally mounted on support ring 89.

In operation it can be seen that as the unloader works downwardly, telescoping boom 86 being connected to the silo wall, rod 90 and thus drum 93 will be pulled upwardly from sleeve 95 until contacts 94 on drum 93 pass beyond and out of contact with contacts 96 on sleeve 95 at which point power cable 91 is disconnected from cable 98 and the unloader is thereby shut off.

Further Modifications

It is apparent that many other switches such as toggle switches, rotary switches for other mechanically operated switches may be employed as well as could those specifically illustrated.

There are many other possible adaptations of the invention besides those specifically pointed out in the examples shown above so as to provide a switch operating device useful on all types or models of silo unloaders designed to follow the surface level of the ensilage inside a silo.

Thus as many apparently widely different embodiments of this invention may be made without departing from the spirit and scope thereof, it is to be understood that I do not limit myself to specific embodiments disclosed herein.

Having thus described my invention, what I claim is:

1. In a silo unloader adapted to be positioned on the surface of the ensilage within a silo having an aperture in the side thereof, said silo unloader having a non-rotating portion and a guide arm pivotally mounted on said non-rotating portion, said guide arm being extendible to the wall of said silo and mountable thereon, a power shut off device for stopping the operation of said silo unloader comprising a switch in the unloader electrical power line, said switch mounted on said non-rotating portion, and switch actuating means on said guide arm, whereby, when said unloader moves downwardly in said silo, causing said guide arm to be pivoted with respect to said unloader, said switch actuating means actuates said switch stopping the operation of said unloader.

2. A power shut off device as in claim 1 in which said switch includes an operating lever for operation thereof and said switch actuating means includes an extension of said guide arm beyond the pivoted point thereof engageable with said switch operating lever for operation of said switch.

3. In a silo unloader adapted to be positioned on the surface of the ensilage within a silo having an aperture in the side thereof, said silo unloader having a non-rotating portion including a discharge unit and support means for said discharge unit, said discharge unit being pivotally mounted on said support means and being adapted for discharge communication with said silo aperture, a portion of said discharge unit being extendible to and pivotally engageable with the silo wall, a power shut off device for stopping the operation of said silo unloader comprising a switch in the unloader electrical power line, said switch mounted on said support means, and switch actuating means extending from said switch to said discharge unit, whereby, when said unloader moves downwardly in said silo, causing said discharge unit to be pivoted with respect to said unloader, said switch actuating means actuates said switch stopping the operation of said unloader.

4. A shut off device as in claim 3 in which said discharge unit includes a support arm and said switch actuating means extends from said support arm to said switch.

5. A shut off device as in claim 3 in which said switch actuating means includes a flexible cable connected from said discharge unit to said switch.

6. A shut off device as in claim 3 in which said switch includes an operating lever for operation thereof, said switch actuating means including a telescoping boom pivotally connected at one end to said discharge unit and at the other end to said switch operating lever, said telescoping boom comprising a rod axially slidably mounted in a sleeve, one end of said rod extending from one end of said sleeve, said rod having an extended position in said sleeve at which it is prevented from further outward axial movement.

7. A shut off device as in claim 6 in which said switch includes a pair of input terminals, each terminal pivotally mounting a knife blade contact, a pair of output terminals for receiving said knife blade contacts, an insulated operating rod rigidly connecting one of said pair of knife blade contacts to the other of said knife blade contacts, a tension spring connected to said operating rod and extending therefrom beyond said input terminals, said operating lever engageable with said operating rod to pivot said contact blades out of contact with said output terminals, and said spring urging said blade connectors away from said contact position after said blades have pivoted through a line parallel with said spring.

8. In a silo unloader adapted to be positioned on the surface of the ensilage within a silo having an aperture in the side thereof, said silo unloader having a non-rotating portion including a discharge unit and support means for said discharge unit, said discharge unit being pivotally mounted on said support means and being adapted for discharge communication with said silo aperture, a portion of said discharge unit being extendible to and pivotally engageable with the silo wall, a power shut off device for stopping the operation of said silo unloader comprising a switch in the unloader electrical power line, said switch mounted on said discharge unit, and switch actuating means extending from said switch to said support means, whereby, when said unloader moves downwardly in said silo, causing said discharge unit to be pivoted with respect to said unloader, said switch actuating means actuates said switch stopping the operation of said unloader.

9. A power shut off device as in claim 8 in which said switch includes an operating lever for operation thereof, said switch actuating means including a telescoping boom pivotally connected at one end to said discharge unit and at the other end to said switch operating lever, said telescoping boom comprising a rod axially slidably mounted in a sleeve, one end of said rod extending from one end of said sleeve, said rod having an extended position in said sleeve at which it is prevented from further outward axial movement.

10. In a silo unloader adapted to be positioned on the surface of the ensilage within a silo having an aperture in the side thereof, said silo unloader having a non-rotating portion including a discharge unit and support means for said discharge unit, said discharge unit being pivotally mounted on said support means and being adapted for discharge communication with said silo aperture, a portion of said discharge unit being extendible to and pivotally engageable with the silo wall, a power shut off device for stopping the operation of said silo unloader comprising a switch in the unloader electrical power line and switch actuating means extending from said discharge unit to said support means, said switch being mounted on said switch actuating means, whereby when said unloader moves downwardly in said silo, causing said discharge unit to be pivoted with respect to said unloader, said switch actuating means actuates said switch stopping the operation of said unloader.

11. In a silo unloader adapted to be positioned on the surface of the ensilage within a silo having an aperture in the side thereof, said silo unloader having a non-rotating portion including a discharge unit and support means for said discharge unit, said discharge unit being pivotally mounted on said support means and being adapted for discharge communication with said silo aperture, a portion of said discharge unit being extendible to and pivotally engageable with the silo wall, a power shut off device for stopping the operation of said silo unloader comprising a switch in the unloader electrical power line and switch actuating means extending from said discharge unit to said support means, said switch actuating means comprising one boom pivotally connected at one end to said discharge unit and another boom pivotally connected at one end to said support means and said switch including a sleeve mounted on the other end of said another boom and a drum mounted on the other end of said one boom, said drum received by said sleeve at one end thereof and axially slidable therethrough and having electrical contacts on the outside thereof connected to an electric power supply and said sleeve having electrical contacts disposed along the inside thereof in contacting relation with the electrical contacts on said drum and connected to the unloader electrical power line, said sleeve electrical contacts extending to a point short of the receiving end thereof so that the electrical contacts on said drum are out of contact with the electrical contacts in said sleeve when said drum is at said receiving end of said sleeve, whereby when said unloader moves downwardly in said silo, causing said discharge unit to be pivoted with respect to said unloader, said switch actuating means actuates said switch stopping the operation of said unloader.

12. In a silo unloader having a non-rotating portion and adapted to be positioned on the surface of the ensilage within a silo having an aperture in the side thereof, a power shut off device for stopping the operation of said silo unloader comprising a switch in the unloader electrical power line and rigid switch actuating means pivotally mounted on said non-rotating portion of said unloader and extendible to and pivotally engageable with the wall of said silo, said switch actuating means cooperable with said switch to actuate said switch to stop the operation of said unloader when said actuating means pivots to a preselected angle with said unloader, whereby when said unloader moves downwardly in said silo, causing said actuating means to be pivoted with respect to said unloader and silo wall, said switch actuating means actuates said switch, stopping the operation of said unloader at a preselected lowered position.

13. In a silo unloader adapted to be positioned on the surface of the ensilage within a silo having a series of vertically spaced apertures in the side thereof, said unloader having a rotating ensilage gathering portion, a non-rotating portion including a discharge unit adapted for discharge communication with said vertically spaced apertures and an electrical power supply; a power shut off device for stopping the operation of said silo unloader comprising a switch interposed between said power supply and said unloader, said switch being mounted on said non-rotating portion of said unloader, and switch actuating means extendible to and engageable with said silo wall, said actuating means being of predetermined length, and operative, when said unloader moves downwardly a predetermined distance in said silo, to trip the switch and stop the unloader.

References Cited in the file of this patent

UNITED STATES PATENTS

| | | |
|---|---|---|
| 2,518,601 | Cordis | Aug. 15, 1950 |
| 2,735,591 | Branchflower | Feb. 21, 1956 |